United States Patent [19]

Curry

[11] Patent Number: 5,208,903
[45] Date of Patent: May 4, 1993

[54] VIDEO IMAGE DISPLAY FOR PREDICTING COLOR HARDCOPY IMAGE QUALITY

[75] Inventor: Kenneth D. Curry, Victor, N.Y.

[73] Assignee: Eastman Kodak Company, Rochester, N.Y.

[21] Appl. No.: 579,529

[22] Filed: Sep. 10, 1990

[51] Int. Cl.$^5$ ............................................. G06F 15/62
[52] U.S. Cl. .................................. 395/131; 395/132; 395/157
[58] Field of Search ............... 395/122, 129, 130, 131, 395/157; 340/701, 702, 703, 704, 715, 716, 717, 724, 728, 279, 730, 792, 793, 794

[56] References Cited

U.S. PATENT DOCUMENTS 4,794,386 12/1988 Bedrij et al. ..................... 340/724
4,876,533 10/1989 Barkans .......................... 340/721

Primary Examiner—Gary V. Harkcom
Assistant Examiner—Huynh Ba
Attorney, Agent, or Firm—Raymond L. Owens

[57] ABSTRACT

In order to permit a user to predict the density, color balance, and contrast of an image to be printed on a hardcopy printing device, an image on a video color display device is provided with a uniform surround of controllable luminance and chrominance levels, the uniform surround being large enough in proportion to the image to mimic the viewing conditions of the final hardcopy. The presentation of user controls for image manipulation is integrated on the same color display device, with controllable brightness as compared to the controlled, uniform surround, to minimize disruption of the user's visual system as pertains to the perception of density, color balance and contrast. The user controls on the display device are faded away into the controlled, uniform surround for critical judgment of the video image. The user controls are subsequently restored to their original, controlled brightness. The rate at which the user controls fade in and fade out on the display device is controlled. Multiple versions of the image are saved in a memory device for easy recall of individual image versions and provision is made for toggled comparison among individual recalled image versions.

2 Claims, 4 Drawing Sheets

VIDEO IMAGE DISPLAY FOR PREDICTING COLOR HARDCOPY IMAGE QUALITY

FIELD OF THE INVENTION

This invention relates to methods of presentation and interaction with a color video display device and controlling said device for color image display, that permit a user to accurately predict, solely from the video rendition of the image(s), the density, color balance and contrast of the print(s) to subsequently made on a hardcopy printing device.

BACKGROUND OF THE INVENTION

Those skilled in the computer graphics or electronic publishing art are familiar with the acronym WYSIWYG. It stands for "What You See Is What You Get", and refers to, for example, in a Computer Aided Design (CAD) System, the ability to render and edit a black and white video drawing on a display, made up of various shapes and sizes, accurately, so that the video display is identical to hardcopy drawings subsequently produced on a graphics printer in terms of geometric proportions, line widths, shading and texture. Similarly, an electronic publishing system permits an editor to merge text and graphics on a video display and prepare fonts, typeface and page layout identical to subsequent laser writer output. This invention extends the WYSIWYG concept to color imagery through video presentation, user interaction, and display control methods so that accurate density, color balance and contrast predictions of subsequent color hardcopy output, can be made by the user, solely from the video display image rendition. It is understood by those skilled in the art that the video display viewing environment must be reasonably controlled to permit the user's visual system to adapt appropriately. For example, ambient lighting with a color temperature significantly different from the white point of the display, should be avoided. Because of the sensitivity and integrating capabilities of the human visual system to total scene information, the video display system that attempts to combine images and image manipulation options on a single video display, must be carefully laid out to minimize disruption of the user's visual system as pertains to the perception of density, color balance and contrast.

SUMMARY OF THE INVENTION

The object of the invention is to permit a user to prejudge density, color balance and contrast of color hardcopy imagery prior to printing, through interaction with a color video display device. Another object of the invention is to integrate the color video image and the user image manipulation controls on a single color video display device without compromising the user's ability to make accurate color quality judgements, due to extraneous visual information from said image manipulation controls confounding the user's visual system, in as much as the viewing environment allows. It is still another object of this invention to provide a means of toggled comparison among several renditions of color image quickly and easily.

These objects are achieved in a method of presentation and interaction with a video color display device and controlling said device for color image display, that permits a user to accurately predict, solely from the video rendition of the image(s) the density, color balance and contrast of the image(s) to be printed on a hardcopy printing device, comprising the steps of:

(a) providing the image on the video color display device, with a uniform surround of controllable luminance and chrominance levels of large enough proportion to mimic the viewing conditions of the final hardcopy;

(b) integrating the presentation of user controls for image manipulation on the same video color display device, with controllable brightness as compared to the controlled, uniform surround, to minimize disruption of the user's visual system as pertains to the perception of density, color balance and contrast;

(c) fading the user controls away, into the controlled, uniform surround for critical judgement of the video image, and subsequently restore the user controls to their original, controlled brightness;

(d) controlling the rate at which the user controls fade in and out; and (e) saving multiple versions of the image(s) in a memory device and easily recall specific versions for toggled comparison.

DETAILED DESCRIPTION OF THE PREFERRED EMBODIMENT

Figure 1:
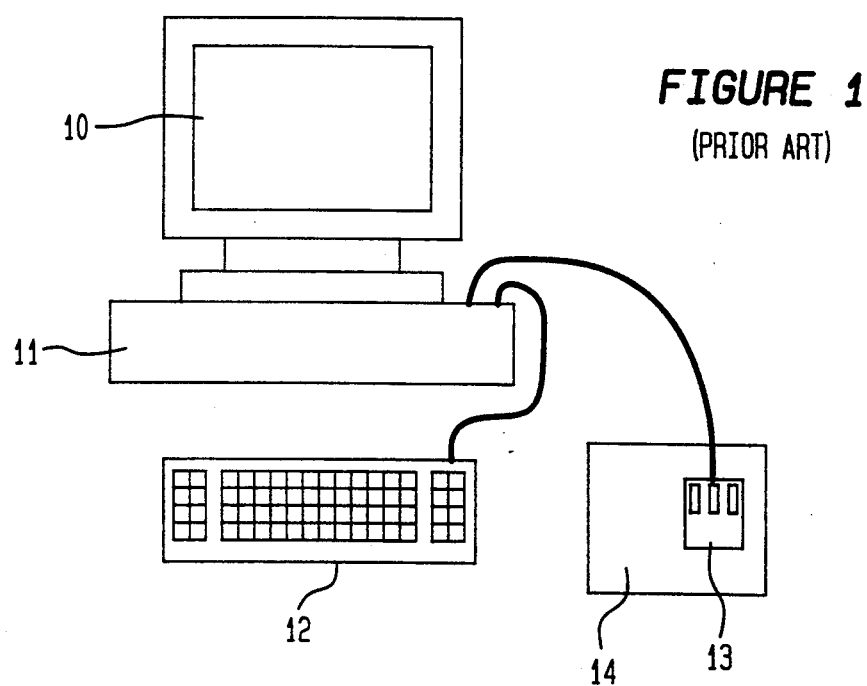
FIG. 1 depicts a typical color graphics workstation with keyboard, display monitor and mouse.
Figure 3:
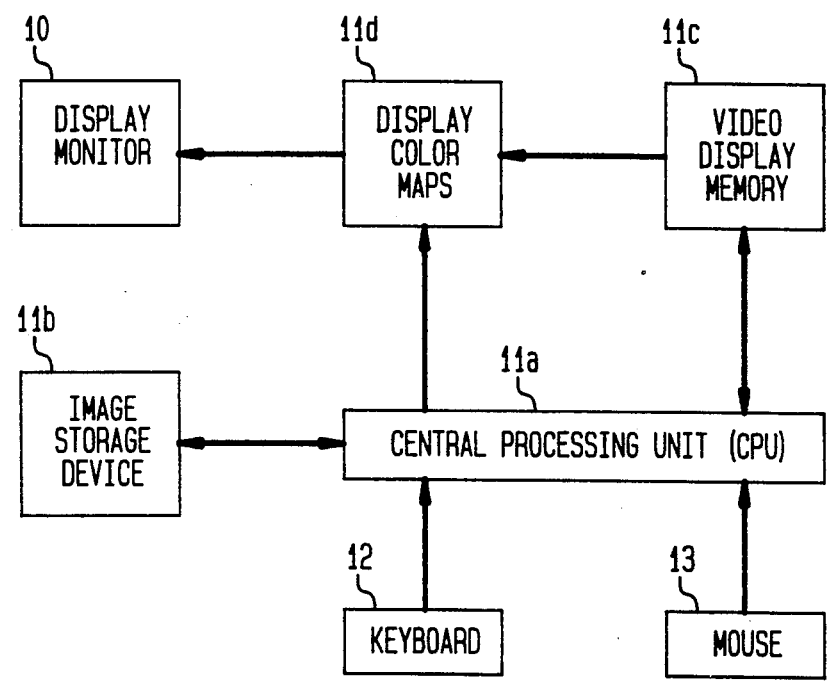
FIG. 3 is a simplified block diagram of the typical color graphics workstation depicted in FIG. 1.

Referring to FIG. 1, a typical color graphics workstation includes a 3-color CRT display monitor 10, workstation support electronics 11, keyboard 12, mouse 13, and mouse pad 14. The workstation support electronics 11, is comprised of, in part, the central processing unit (CPU) 11a, non-volatile image storage device 11b, video display memory 11c, and display color maps 11d, as depicted in FIG. 3. FIG. 3 also shows the interfaces between the aforementioned components, as well as the keyboard 12 and CPU 11a, mouse 13 and CPU 11a, and display color maps 11d and color video display 10.

The support electronics 11 also includes a memory which stores software components including an operating system and windowing system, typically available on color graphics workstations. As is conventional, the operating system acts as a computing resource manager and provides, in part, management of a file system, access to storage device(s) upon which the file system resides, memory management, peripheral device management (e.g. keyboard and mouse), process management and exception handling. The windowing system provides graphical support for visual object creation and manipulation, and access to the video display memory and display color maps. For purposes of discussion the following terms are defined, relating to the object-oriented windowing system used in work stations such as made by Sun Microsystems Inc. See SunView 1 Programmer's Guide, 1982-1988 by Sun Microsystems Inc. (Chapter 2, pages 9-12). For purposes of this disclosure, three classes of objects exist, windows, subwindows and objects. These objects are well known and available on many workstations. Frames and subwindows will be understood to be included in window objects. Ronoverlapping subwindows are contained within the borders of frames. Panel subwindows and canvas subwindows are two types of subwindows. A panel subwindow is a subwindow containing panel items. Programs can write into canvas subwindows. Panel items are components of a panel subwindow that aid in interaction between the user and the application. Panel items are manipulated under program control. Panel items include text items, message items, choice items, sliders and buttons. Other types of visual objects include sprite (i.e., pointer), menus, and scrollbar. A sprite will be understood to be a visual object that designates the mouse location on the display. A user makes selections and issues commands through menu objects. Menus appear on the display when needed, and vanish when no longer needed. Scrollbars are not used in the invention's preferred embodiment. Additionally, because of the critical nature of the visual adaptation requirements of the field of the invention, other flexible features typically found in windowing applications are intentionally removed in the preferred embodiment including the ability to move and resize windows.

Figure 2:
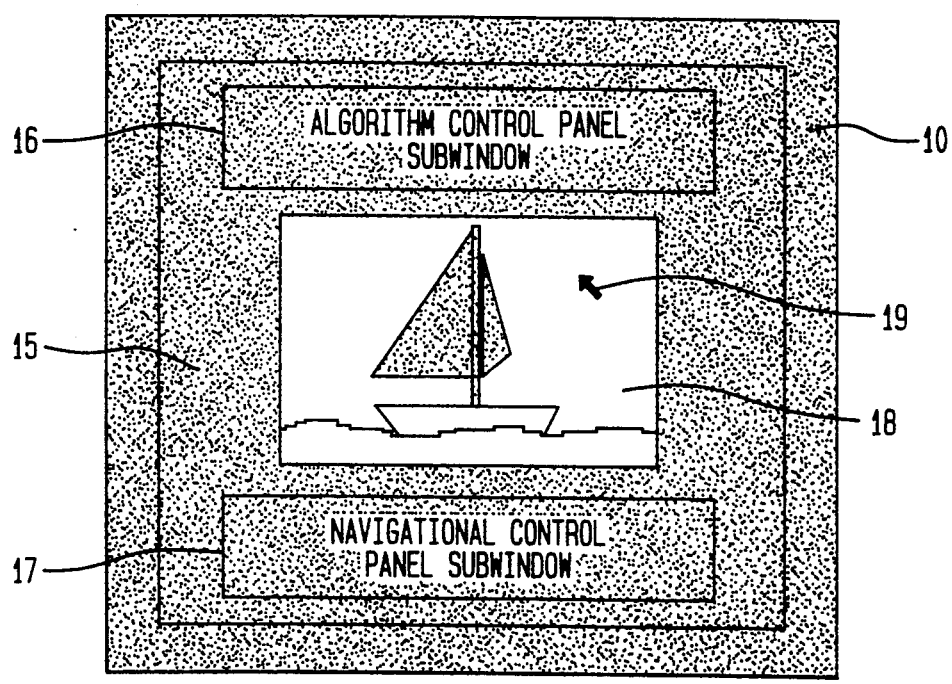
FIG. 2 depicts a physical display layout on the display monitor of FIG. 1 in accordance with the invention.

Referring to FIG. 2, a physical layout and control of the display will be described using the aforementioned terms. For clarity of illustration, it will be assumed that an image of interest has been selected for retrieval from the image storage device 11b. Using the windowing system, a frame 15 is created the full size of the active display. This frame serves as the background for subsequent objects and is given attributes including the appropriate color for the application at hand. For instance, if the color hardcopy output is to be a photographic print, normally viewed in room light or sunlight, the appropriate color attributes would be 18% gray. If the color hardcopy output is to be transparency material, normally viewed as projected images in a dark room, the appropriate frame color attributes would be black with a narrow white border surrounding the canvas subwindow 18, providing the user's visual system with a white point reference. Next, a canvas subwindow 18 is created in the center of the display. In one specific example, this canvas for the video image had dimensions of 512 high by 768 wide picture elements on a Sony Trinitron graphic display monitor model number GDM-1604-15 out of a total 900 high by 1152 wide active picture elements for the entire display. The image size was carefully selected to leave adequate surround with controllable luminance and chrominance levels to permit the appropriate visual system adaptation to mimic the viewing conditions of the hardcopy image. In the preferred embodiment, this image canvas, once created, is delivered to a TAAC-1 Video Accelerator, with 32 bits per picture element capability—8 bits each for red, green, blue and alpha channels. The TAAC-1 Video Accelerator is provided in electronics 11 and provides true 24 bit color (and an 8-bit overlay plane) and enough video display memory to hold 4 or more renditions of the image to be viewed in toggled comparison to be described later. The TAAC-1 Video Accelerator is representative of a class of devices well-known in the art that enables the simultaneous viewing of both workstation and accelerator video from the same display device. The TAAC-1 provides the video signal for canvas subwindow 18 and has its own set of color maps for the video signal. Separate color maps for image canvas subwindow 18 and workstation panel subwindows 16 and 17 are required for the fade in/fade out function described later. Next, user controls in the form of two panel subwindows 16 and 17 were created above and below the image canvas subwindow 18. Alternatively, the control panel subwindows could be created above and/or below and/or left and/or right of image canvas subwindow 18. Panel items are created in panel subwindow 16 for the purpose of providing sprite activated control for various digital image processing algorithms, including density, color balance and contrast manipulation. Density adjustment can be accomplished by adding a signed user specified offset to all the red, green and blue picture elements associated with the currently displayed portion of video display memory 11c in canvas subwindow 18, with appropriate clipping of the digital values for underflow and overflow. Alternatively, density adjustment can be accomplished by shifting all entries in the red, green and blue color maps for canvas subwindow 18, "n" locations, wherein "n" is the user specified density offset. This method requires that the first or last entry in each of the color maps be replicated in the first or last "n" location of the color maps, depending on the sign of the offset. Color balance adjustment is accomplished in similar fashion to the two methods described for density adjustment with the only difference that a single color (red, green or blue) is effected. Contrast adjustment can be accomplished by modifying all entries in the red, green and blue color maps associated with canvas subwindow 18 according to the point slope form of the equation of a line:

$$Y_n = m(X_n - X) + Y$$

where $Y_n$ is the new entry for location $X_n$ in the color map for $0 \leq n < P$ where P is the number of entries in the color map (typically a power of 2), m is the user specified slope and x,y are the coordinates of the user specified pivot point. Appropriate clipping is again required to avoid underflow and overflow.

A plurality of other image processing algorithms that do not result in video rendition of the image that is significantly different from subsequently produced hardcopy output in spatial frequency content are well-known in the art and include enlarge, reduce, rotate, local colorization (e.g. red eye removal), tone scale manipulation and saturation adjustment. These image processing algorithms can be used with features of this invention. The actual layout of the algorithm controls in panel subwindow 16, though ergonomically important, are not critical to the understanding of the invention. Those skilled in the art are familiar with the creation and utilization of panel items such as buttons, choice items and sliders for acquiring user input via keyboard 12 and mouse 13. What is critical to the invention is the means provided to set the text and object brightness of the algorithm controls (panel items) to a user preferred level to minimize the disruption of the user's visual system. This is accomplished by using the windowing system to set the color attributes of the foreground of the panel items within the algorithm control panel subwindow 16. Furthermore, the color attributes of the background of the panel items within the algorithm control panel subwindow 16 are set to the same levels as the background frame 15 so that the border of the subwindow is invisible against the background frame and only the panel items are visible. Panel items in panel subwindow 17 are created and controlled in like fashion to those in panel subwindow 16, with identical foreground and background color attributes. Panel items in the navigational control panel subwindow 17 are used for navigation—that is, to change the algorithm control panel items from one set to another, request the menu for setting the defaults for panel item foreground brightness and fade speed (description shortly), confirm image is acceptable ("PRINT"), quit the application, and the like. Sprite 19 indicates the current position of the mouse on the display and tracks mouse movement on the mouse pad.

Figure 4:
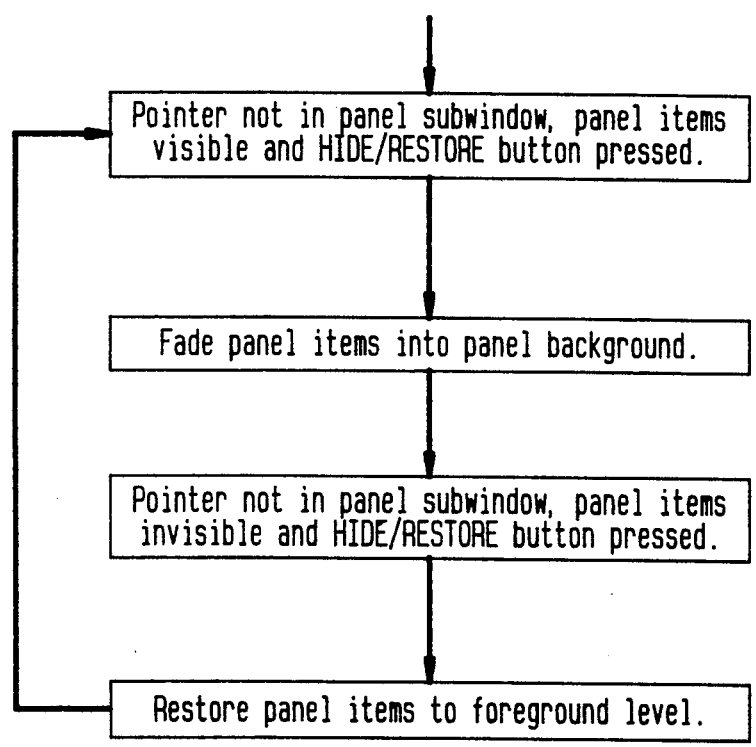
FIG. 4 is a flow chart showing the image manipulation controls fade in, fade out operation in accordance with this invention.

Whenever the sprite is anywhere on the display, other than in the algorithm control panel subwindow 16, or navigational control panel subwindow 17, and the center mouse button (HIDE/RESTORE button) is pressed, the fade in/fade out control procedure is executed, as described in FIG. 4.

The fade in/fade out function is accomplished by rewriting the display color maps associated with panel subwindows 16 and 17 at the user prescribed rate as follows. (The display color maps function as lookup tables where the input digital pixel values are used as indices into the table and are replaced with the contents of the indexed location). To fade out, the display color map foreground section entries are decremented one value at a time until the foreground section entries are nearly equivalent to the background section entries, thus causing the panel items to fade into the panel background, rendering them invisible. To fade in, the display color map foreground section entries are incremented one value at a time until the foreground section entries are equal to the original user defined panel item foreground brightness levels, thus causing the panel items to fade in to discernable view once again. The purpose of this function is to permit the user to make critical judgements pertaining to density, color balance and contrast of the video displayed image, without distracting the user's visual system with extraneous scene information (panel items). The fade rate and panel item foreground brightness levels are user selected via a menu option from the navigational control panel subwindow 17.

As stated previously, one reason that the TAAC-1 Video Accelerator is used in the preferred embodiment is its large amount of video memory—enough to hold multiple versions of the image being manipulated. This permits the user to create a "stack" of image versions in video display memory that can be compared in rapid, consecutive fashion, through the use of a simple selection mechanism, offered to the user as panel item(s) in the algorithm control panel subwindow 16. As each of, say, four saved versions of the image is selected, the TAAC-1 Video Accelerator is instructed to select the corresponding region of video display memory as the active display region, thus permitting toggled comparison of multiple renditions of the image.

After an image is manipulated to its most pleasing density, color balance and contrast, the user selects the "PRINT" panel item in the navigational control panel subwindow 17. This instructs the CPU to save the image processing parameters set by the user, to be subsequently applied to the full resolution image, presumably stored in the non-volatile image storage device. How the full resolution image is processed to reflect the user's preference is inconsequential to the object of the current invention. Calibration procedure should be used to compensate for differences between the video display phosphor transfer function and the combined hardcopy media and output device transfer function. Suffice to say that the particular color video display monitor should include controls to set the color temperature of the white point.

The invention has been described in detail with particular reference to certain preferred embodiments thereof, but it will be understood that variations and modifications can be effected within the spirit and scope of the invention. For example, an embodiment of the invention for photofinishing application could display a plurality of images simultaneously within image canvas subwindow 18, rather than a single image, for assessment of within order uniformity, prior to printing.

I claim:

1. A method of presentation and interaction with a video color display device and of controlling said device for color image display, the method permitting a user to accurately predict, solely from the video rendition of the image(s), the density, color balance and contrast of the image(s) to be printed on a hardcopy printing device, the method comprising the steps of:
   (a) providing the image on the video color display device with a uniform surround of controllable luminance and chrominance levels, the uniform surround being large enough in proportion to the image to mimic the viewing conditions of the final hardcopy;
   (b) integrating the presentation of user controls for image manipulation on the same video color display device, with controllable brightness as compared to the controlled, uniform surround, to minimize disruption of the user's visual system of density, color balance and contrast;
   (c) fading the user controls away, into the controlled, uniform surround for critical judgment of the video image;
   (d) subsequently restoring the user controls to their original, controlled brightness;
   (e) controlling the rate of the fade in and fade out of the user controls;
   (f) saving multiple versions of the image(s) in a memory device; and
   (g) providing easy recall of individual versions of the image(s) from the memory device for toggled comparison among such recalled image versions.

2. The method of claim 1 further including the step of providing a narrow controlled white border around the image for applications where the appropriate hardcopy viewing condition is a black surround, the white border providing the visual system a white point of reference.

* * * * *